(12) United States Patent
Toda et al.

(10) Patent No.: US 8,264,161 B2
(45) Date of Patent: Sep. 11, 2012

(54) LIGHTING APPARATUS FOR HIGH-VOLTAGE DISCHARGE LAMP

(75) Inventors: Takafumi Toda, Takatsuki (JP); Kengo Miyazaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 67 days.

(21) Appl. No.: 12/782,813

(22) Filed: May 19, 2010

(65) Prior Publication Data

US 2010/0219765 A1    Sep. 2, 2010

Related U.S. Application Data

(63) Continuation of application No. PCT/JP2008/067218, filed on Sep. 25, 2008.

(30) Foreign Application Priority Data

Nov. 20, 2007   (JP) .................................. 2007-300644

(51) Int. Cl.
    *H05B 39/02*   (2006.01)
(52) U.S. Cl. ...................... 315/209 R; 315/291; 315/307
(58) Field of Classification Search .............. 315/209 R, 315/224, 226, 291, 297, 299, 300, 307, 308, 315/362
    See application file for complete search history.

(56) References Cited

U.S. PATENT DOCUMENTS

| 6,597,118 B2 * | 7/2003 | Arimoto et al. ............... 315/115 |
| 2002/0041165 A1 * | 4/2002 | Cammack ..................... 315/291 |
| 2004/0004448 A1 | 1/2004 | Arimoto et al. |

FOREIGN PATENT DOCUMENTS

| JP | 3-116693 A | 5/1991 |
| JP | 5-258879 A | 10/1993 |
| JP | 2000-123989 A | 4/2000 |
| JP | 2003-59684 A | 2/2003 |
| JP | 2003-217888 A | 7/2003 |
| JP | 2005-50662 A | 2/2005 |
| JP | 2006-49181 A | 2/2006 |
| JP | 2006-179414 A | 7/2006 |
| JP | 2007-287508 A | 11/2007 |

OTHER PUBLICATIONS

Official Communication issued in International Patent Application No. PCT/JP2008/067219, mailed on Dec. 9, 2008.
Official Communication issued in corresponding Japanese Patent Application No. 2009-542502, mailed on Dec. 13, 2011.

* cited by examiner

*Primary Examiner* — Douglas W Owens
*Assistant Examiner* — Jianzi Chen
(74) *Attorney, Agent, or Firm* — Keating & Bennett, LLP

(57) ABSTRACT

In a lighting apparatus for a high-voltage discharge lamp, a control circuit controls a switching element of a step-down chopper circuit and that of an igniter circuit such that the switching elements are synchronously turned on/off, and controls the switching of the switching element of the step-down chopper circuit in accordance with an amount of a drop in the output voltage of the step-down chopper circuit when lighting of a high-voltage discharge lamp is started such that inrush current flowing when the high-voltage discharge lamp breaks down is suppressed. With this, when a lighting apparatus starts lighting the high-voltage discharge lamp, the inrush current flowing when the lamp breaks down can be minimized in response to variations in the load of the high-voltage discharge lamp. In addition, the lifetime of the high-voltage discharge lamp can be increased since inrush current during glow discharge can be suppressed.

5 Claims, 4 Drawing Sheets

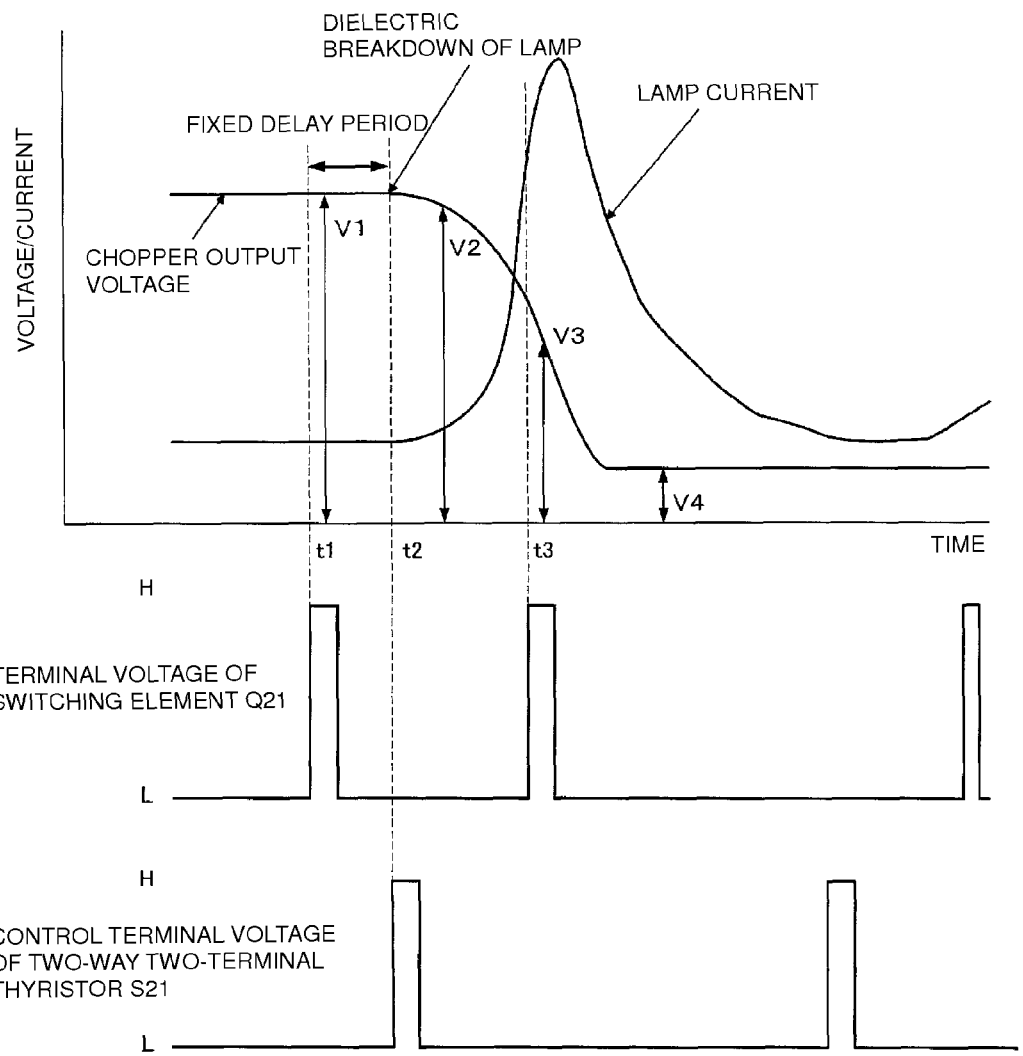

LIGHTING APPARATUS FOR HIGH-VOLTAGE DISCHARGE LAMP

BACKGROUND OF THE INVENTION

1. Field of the Invention

The present invention relates to lighting apparatuses for lighting high-voltage discharge lamps used for, for example, front projectors.

2. Description of the Related Art

Japanese Unexamined Patent Application Publication No. 2000-123989 describes a lighting apparatus for lighting a high-voltage discharge lamp used for, for example, a front projector.

The apparatus described in Japanese Unexamined Patent Application Publication No. 2000-123989 will now be described with reference to FIG. 1. A lamp 5 is, for example, a 150-watt 75-volt metal halide lamp. A DC power source 1 requires an output open-circuit voltage (OCV) higher than a voltage required by the lamp for maintaining the discharge before the lamp breaks down. This output open-circuit voltage can be preferably 200 to 400V.

The voltage of the DC power source 1 is supplied to a step-down chopper circuit 2. The step-down chopper circuit 2, including a switching element 11, a diode 12, and an inductor 13, is of a typical switching power-supply type. The inductance of the inductor 13 is, for example, 0.39 mH.

A voltage detecting circuit 7 that detects the output voltage of the step-down chopper circuit 2 and a current detecting circuit 6 that detects the output current are disposed downstream of the step-down chopper circuit 2. The output voltage and the output current are input to an operating circuit 8, and fed back to the switching element 11 via a pulse-width modulating circuit 9.

The step-down chopper circuit 2 is switched on/off at a high frequency (tens to hundreds of kilohertz). The pulse-width modulating circuit 9 controls the pulse width of the switching element 11 in the step-down chopper circuit 2 such that a fixed power is supplied after the lamp lighting is stabilized on the basis of the detected output voltage and output current.

Although the power supplied from the step-down chopper circuit 2 is mainly used for power control after arc discharge occurs, the pulse-width modulating circuit 9 controls the step-down chopper circuit 2 such that appropriate energy can be supplied also during a phase of glow discharge. A glow current of, for example, several hundreds of milliamperes is supplied.

A switching circuit 16 insulates a smoothing capacitor 14 from the output of the step-down chopper circuit before arc discharge occurs so that the lamp can be appropriately lit, and connects the capacitor to the step-down chopper circuit 2 after arc discharge occurs so that ripples are removed and so that the lamp stably operates without acoustic resonance.

A timer 20 is set to, for example, about three seconds, and the switching circuit 16 insulates the capacitor during the time set by the timer 20 after an igniter 4 starts operating so that the discharge state of the lamp immediately switches to arc discharge.

When the discharge lamp 5 breaks down and the load is momentarily short-circuited while the lamp is lit, the control of the step-down chopper circuit 2 cannot respond to the rate at which inrush current momentarily passes through the discharge lamp 5 since the step-down chopper circuit 2 and the igniter 4 are independently controlled. That is, a few pulses of inrush current with a high peak value as shown in FIG. 2 pass through the lamp although the inrush current is suppressed by the switching circuit 16 that insulates the large-capacitance capacitor 14 in the circuit and only energy charged in a small-capacitance capacitor 15 is supplied to the discharge lamp 5.

Since the inrush current passing through the discharge lamp during the breakdown affects the lifetime of the discharge lamp, the peak value and the time period during which the current is applied need to be suppressed.

However, the lighting apparatus used for the high-voltage discharge lamp described in Japanese Unexamined Patent Application Publication No. 2000-123989 uses the small-capacitance capacitor 15 and the large-capacitance capacitor 14, and connects or disconnects the large-capacitance capacitor 14 using the switching circuit 16 in order to realize smooth switching of the discharge state of the lamp from glow discharge to arc discharge and stable operation during steady lighting after arc discharge occurs. This disadvantageously leads to an increase in cost and in the space taken up by parts.

Moreover, even though the apparatus uses a small-capacitance capacitor, the control of the control circuit may not be able to respond to a high breakdown speed when the discharge lamp breaks down. Since energy supplied from the capacitor 15 to the discharge lamp cannot be reduced by shortening the on-duty cycle of the switching element 11, the small-capacitance capacitor requires a certain degree of capacitance. Therefore, inrush current is not necessarily minimized.

SUMMARY OF THE INVENTION

According to a preferred embodiment of the present invention, a lighting apparatus for a high-voltage discharge lamp is capable of stably operating the lamp during switching of the discharge state of the lamp from glow discharge to arc discharge while the lamp is lit and until steady lighting is achieved after arc discharge occurs without requiring additional passive elements such as capacitors.

A lighting apparatus for a high-voltage discharge lamp according to a preferred embodiment of the present invention includes a DC-voltage input terminal to which a first DC voltage is supplied; a DC-DC converter circuit arranged to convert the first DC voltage into a second DC voltage; an output-voltage detecting circuit arranged to detect an output voltage of the DC-DC converter circuit; a DC-AC inverter circuit arranged to convert the DC voltage output from the DC-DC converter circuit into an AC voltage at a desired frequency; a lamp-current detecting circuit arranged to detect the lamp current passing through the high-voltage discharge lamp; an igniter circuit arranged to operate when the lighting of the high-voltage discharge lamp is started and to apply a high voltage to the high-voltage discharge lamp; and a control circuit arranged and programmed to control the DC-DC converter circuit and the DC-AC inverter circuit. The igniter circuit, the DC-DC converter circuit, and the DC-AC inverter circuit each preferably include a semiconductor switching element. The control circuit controls switching of the semiconductor switching element of the DC-DC converter circuit and the semiconductor switching element of the DC-AC inverter circuit in accordance with the output voltage detected by the output-voltage detecting circuit and the lamp current detected by the lamp-current detecting circuit such that ON/OFF timings of the semiconductor switching element of the DC-DC converter circuit and ON/OFF timings of the semiconductor switching element of the igniter circuit are synchronized when the lighting of the high-voltage discharge lamp is started, such that the semiconductor switching element of the igniter circuit is turned on after a predetermined period of time after the semiconductor switching element of the DC-DC converter circuit is turned on, and such that the semiconductor switching element of the DC-DC converter circuit is directed not to output the next ON pulse when the voltage detected by the output-voltage detecting circuit changes and drops by a predetermined value or more within a predetermined period of time.

The DC-DC converter circuit may preferably be a step-down chopper DC-DC converter circuit.

The DC-AC inverter circuit may preferably be a full-bridge inverter circuit.

The control circuit may preferably include a DSP.

The control circuit preferably controls the DC-DC converter circuit using a PWM control scheme.

The DSP may preferably be arranged to switch the DC-DC converter circuit to a fixed-current control mode after the high-voltage discharge lamp is lit, and to control gain of negative feedback control performed by the control circuit to prevent the output current of the DC-DC converter circuit from fluctuating and to stabilize the output current of the DC-DC converter circuit when the DSP generates PWM pulses for the semiconductor switching element of the DC-DC converter circuit inside thereof.

According to various preferred embodiments of the present invention, the lamp can stably operate during switching of the discharge state of the lamp from glow discharge to arc discharge while the lamp is lit and during steady lighting after arc discharge occurs without any additional passive elements such as capacitors or switching circuits.

Furthermore, inrush current passing through the discharge lamp when the lamp breaks down can be minimized, and the lifetime of the discharge lamp can be increased.

Other elements, features, steps, characteristics and advantages of the present invention will become more apparent from the following detailed description of the preferred embodiments with reference to the attached drawings.

BRIEF DESCRIPTION OF THE DRAWINGS

FIG. 4 includes waveform charts illustrating output voltage of a step-down chopper circuit 22, lamp current passing through a high-voltage discharge lamp connected as a load, voltage of a control terminal of a switching element Q21, and voltage of a control terminal of a two-way two-terminal thyristor S21 in the lighting apparatus for the high-voltage discharge lamp according to a preferred embodiment of the present invention.

DETAILED DESCRIPTION OF THE PREFERRED EMBODIMENTS

A preferred embodiment of the present invention will now be described with reference to FIG. 3.

Figure 1:
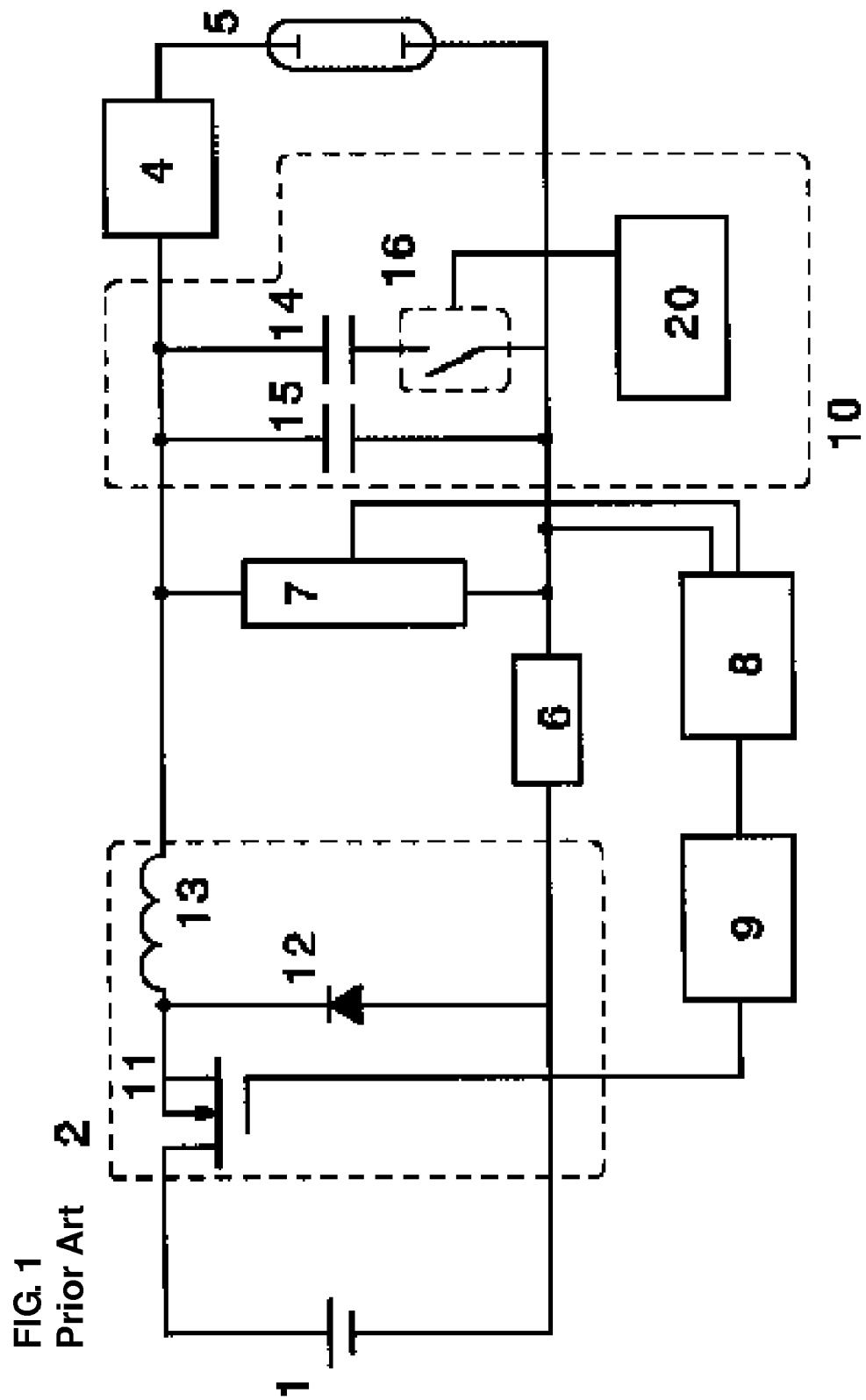
FIG. 1 is a circuit block diagram of a lighting apparatus for a high-voltage discharge lamp described in Japanese Unexamined Patent Application Publication No. 2000-123989.
Figure 2:
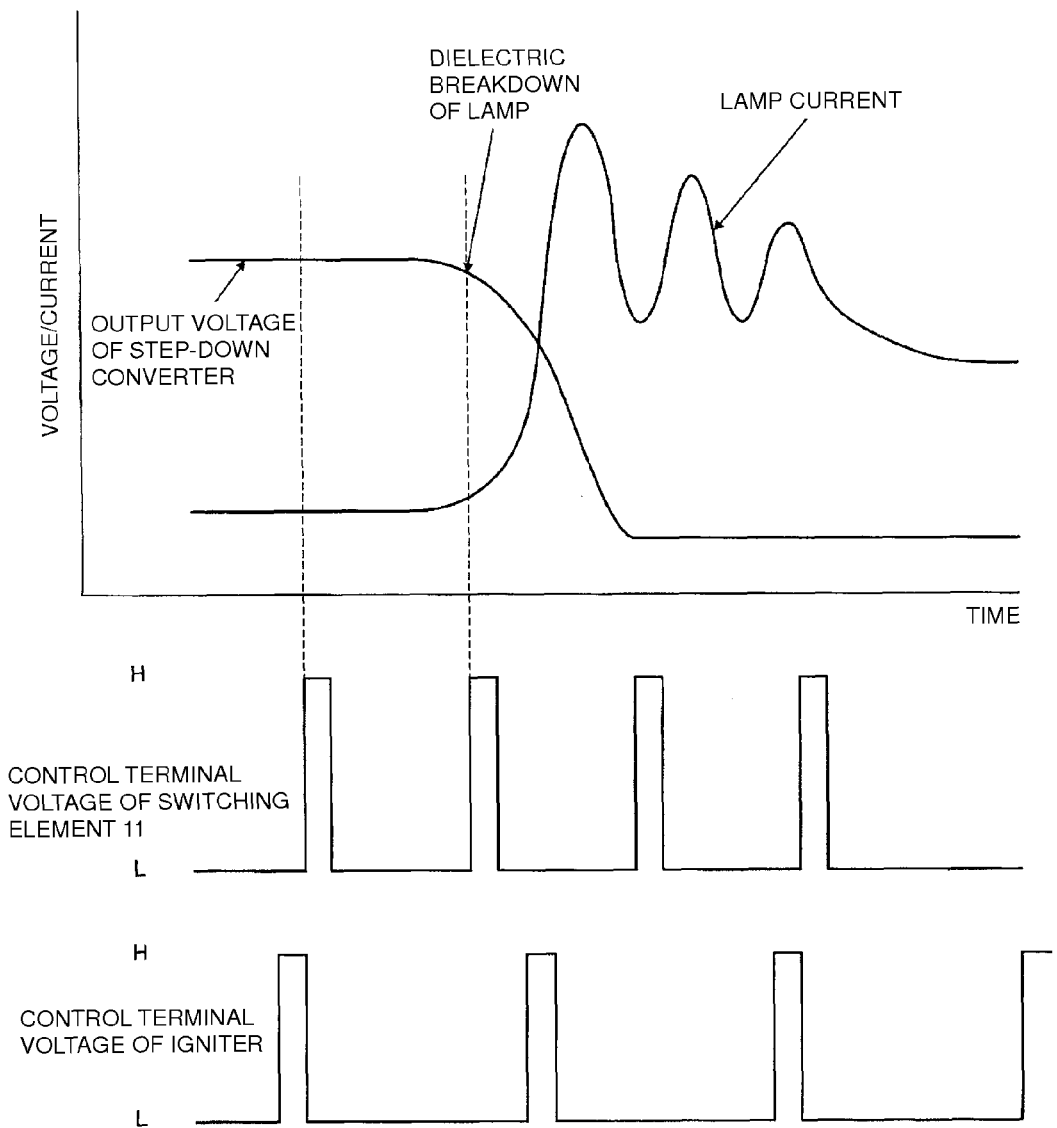
FIG. 2 includes waveform charts illustrating output voltage of a step-down chopper circuit 2, lamp current passing through a discharge lamp 5 connected as a load, voltage of a control terminal of a switching element 11, and voltage of a control terminal of an igniter 4 in the lighting apparatus for the high-voltage discharge lamp described in Japanese Unexamined Patent Application Publication No. 2000-123989.
Figure 3:
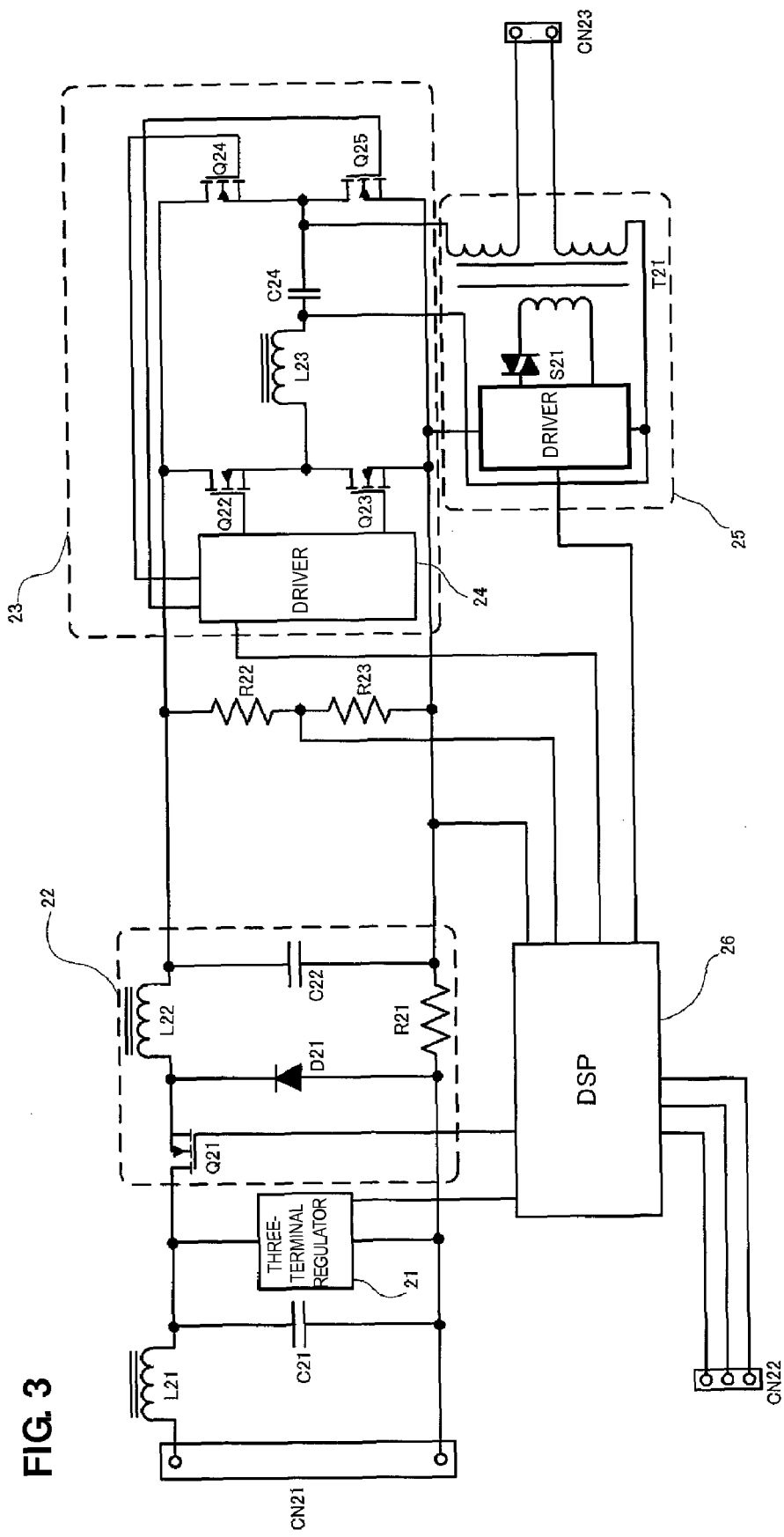
FIG. 3 is a circuit block diagram of a lighting apparatus for a high-voltage discharge lamp according to a preferred embodiment of the present invention.

In FIG. 3, DC voltage is input to a connector CN21 serving as an input terminal to which a DC-voltage is applied. A low-pass filter including an inductor L21 and a capacitor C21 stabilizes the DC voltage input from the connector CN21 and removes noise, for example. A step-down chopper circuit 22 serving as a DC-DC converter circuit is disposed downstream of the filter. In this preferred embodiment, the step-down chopper circuit is used since the input voltage is assumed to be high. However, a step-up chopper circuit can be used when the input voltage is low, or a step-up/step-down chopper circuit can be used depending on the situation as a matter of course.

The step-down chopper circuit 22 includes a switching element Q21 serving as a semiconductor switching element such as a FET, a diode D21, an inductor L22, and a capacitor C22. The step-down chopper circuit 22 steps down the input DC voltage, and outputs a desired voltage in accordance with control performed by a digital control circuit 26 that switches on/off the switching element Q21.

The voltage output from the step-down chopper circuit is divided by resistors R22 and R23 serving as an output-voltage detecting circuit, and the divided voltages are input to the digital control circuit 26. With this, the digital control circuit 26 can monitor the voltage output from the step-down chopper circuit 22, and can perform control such that a fixed voltage is output.

A three-terminal regulator 21 disposed upstream of the step-down chopper circuit 22 generates power-supply voltage for the digital control circuit 26, and the voltage output from the three-terminal regulator 21 is used as the power-supply voltage of the digital control circuit 26.

The energy output from the step-down chopper circuit 22 is charged into the capacitor C22 while the switching element Q21 is turned on, and the energy charged in the capacitor C22 is supplied to a polarity reversing circuit 23 disposed downstream of the capacitor while the switching element Q21 is turned off.

The polarity reversing circuit 23 preferably is a so-called full-bridge inverter circuit including four switching elements Q22 to Q25, an inductor L23, a capacitor C24, and a driver 24 that drives the switching elements Q22 to Q25. Although the polarity reversing circuit 23 in this preferred embodiment is preferably of the full-bridge type, a half-bridge circuit or a push-pull circuit, for example, can be used depending on the situation as a matter of course.

The driver 24 operates as a DC-AC inverter circuit complementarily turning on/off a set of the switching elements Q22 and Q25 and a set of the switching elements Q23 and Q24 in accordance with command signals from the digital control circuit 26 so as to convert DC voltage into AC voltage. The AC voltage generated herein is supplied to a high-voltage discharge lamp (not shown) connected to a connector CN23.

In addition, a transformer T21 including a two-way two-terminal thyristor S21 and an igniter circuit 25 is disposed on the output line of AC voltage to the connector CN23. A general high-voltage discharge lamp requires a significantly high voltage when it is lit, but can continue lighting with a relatively low voltage once it is lit. Therefore, a voltage higher than that used during a steady operation is generated by turning on/off the two-way two-terminal thyristor S21 for a predetermined period of time in accordance with the command signals from the digital control circuit 26 when the lighting of the lamp is started so that the high voltage is momentarily applied to the high-voltage discharge lamp.

Moreover, the lamp current passing through the high-voltage discharge lamp corresponding to a load is detected by detecting current passing through the inductor L22, the current equivalently corresponding to the lamp current during steady lighting, using the resistors R21 acting as the lamp-current detecting circuit disposed in the step-down chopper circuit 22, and is monitored by the digital control circuit 26.

A connector CN22 connected to the digital control circuit 26 connects the lighting apparatus to, for example, a microcomputer of an apparatus such as a front projector. Information such as the operating state of the lighting apparatus for the high-voltage discharge lamp and command signals for the output voltage and the output current can be communicated through the connector.

The digital control circuit 26 manages, for example, commands for turning on/off the switching element Q21 of the step-down chopper circuit 22, commands to the driver 24 for controlling the switching of the switching elements Q22 to Q25 of the polarity reversing circuit, and commands to the igniter circuit 25 during lighting in an integrated manner in accordance with, for example, the output voltage of the step-down chopper circuit 22 detected using the resistors R22 and R23, the current passing through the inductor L22 detected using the resistors R21, and commands issued by the apparatus and communicated through the connector CN22.

Herein, the switching element Q21 of the step-down chopper circuit 22 is controlled using a PWM control scheme in accordance with ON/OFF command signals output from the digital control circuit 26. When the switching element Q21 is PWM-controlled, the switching frequency is fixed. Therefore, the switching timing of the switching element Q21 and the switching timing of the two-way two-terminal thyristor S21 can be logically synchronized by setting the switching frequency of the switching element Q21 to an integral multiple of the switching frequency of the two-way two-terminal thyristor S21 of the igniter circuit 25. However, similar effects can be obtained even when other methods using a fixed switching frequency such as PAM control are used as a matter of course.

FIG. 4 includes timing charts of the output voltage of the step-down chopper circuit 22, the lamp current passing through the high-voltage discharge lamp connected as a load, the control-terminal voltage of the switching element Q21 of the step-down chopper circuit 22, and the control-terminal voltage of the two-way two-terminal thyristor S21 of the igniter circuit 25.

The switching element Q21 of the step-down chopper circuit 22 is turned on at time t1 while the high-voltage discharge lamp is not lit. The switching element Q21 is turned on/off at a fixed switching frequency, and stably outputs a predetermined output voltage V1. The two-way two-terminal thyristor S21 of the igniter circuit 25 is turned on at time t2 after a predetermined period of time from the time t1 so that the high-voltage discharge lamp is lit. When the two-way two-terminal thyristor S21 is turned on, a high voltage is applied to the transformer T21 and, consequently, to the high-voltage discharge lamp serving as a load. As a result, the high-voltage discharge lamp breaks down (dielectric breakdown), and is momentarily short-circuited. This leads to a rapid drop of the output voltage of the step-down chopper circuit 22 detected using the resistors R22 and R23, and at the same time, a rapid increase in the lamp current.

The digital control circuit 26 detects and monitors the output voltage of the step-down chopper circuit 22 by regularly sampling the voltage on the basis of a given clock frequency. When the output voltage of the step-down chopper circuit 22 drops by a predetermined value or more (V2 to V3) during a predetermined sampling period, the digital control circuit 26 determines that the high-voltage discharge lamp starts breaking down, and stops outputting ON pulses even when timings for turning on the switching element Q21 arrive so that the step-down chopper circuit 22 does not charge more energy than required into the capacitor C22. That is, the step-down chopper circuit is switched to a fixed-current control mode. With this, no more energy is charged into the capacitor C22, and inrush current momentarily passing through the high-voltage discharge lamp during lighting of the lamp can be minimized.

The output voltage V4 of the step-down chopper circuit 22 is substantially fixed while the discharge state of the high-voltage discharge lamp switches from glow discharge to arc discharge after the above-described control actions. At this moment, the control gain immediately after the return (gain of negative feedback control performed by the digital control circuit 26 to prevent the output current of the step-down chopper circuit 22 from fluctuating and to stabilize the output current) is set relatively high since the PWM control over the switching element Q21 returns after a period during which an ON pulse output is skipped. The reason is as follows. Since the step-down chopper circuit is temporarily stopped so that the inrush current passing through the lamp is suppressed, no energy remains in the capacitor C22. Therefore, if the control gain remains low, the on-duty cycle immediately after the PWM control returns becomes short, and energy charged into the capacitor C22 becomes inadequate. As a result, the high-voltage discharge lamp cannot maintain arc discharge, and may go out.

The high-voltage discharge lamp switches to a steady lighting mode through the above-described control.

Herein, the digital control circuit 26 can preferably include a DSP (digital signal processor), for example. In addition, the digital control circuit can include, for example, a microcomputer. However, a DSP is more effective in view of processing speed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lighting apparatus for a high-voltage discharge lamp comprising:
   a DC-voltage input terminal to which a first DC voltage is supplied;
   a DC-DC converter circuit arranged to convert the first DC voltage into a second DC voltage;
   an output-voltage detecting circuit arranged to detect an output voltage of the DC-DC converter circuit;
   a DC-AC inverter circuit arranged to convert the DC voltage output from the DC-DC converter circuit into an AC voltage;
   a lamp-current detecting circuit arranged to detect a lamp current passing through the high-voltage discharge lamp;
   an igniter circuit arranged to operate when lighting of the high-voltage discharge lamp is started and to apply a high voltage to the high-voltage discharge lamp; and
   a control circuit arranged and programmed to control the DC-DC converter circuit and the DC-AC inverter circuit; wherein
   the igniter circuit, the DC-DC converter circuit, and the DC-AC inverter circuit each include a semiconductor switching element;
   the control circuit is arranged and programmed to control switching of the semiconductor switching element of the DC-DC converter circuit and the semiconductor switching element of the DC-AC inverter circuit in accordance with the output voltage detected by the output-voltage detecting circuit and the lamp current detected by the lamp-current detecting circuit such that ON/OFF timings of the semiconductor switching element of the DC-DC converter circuit and ON/OFF timings of the semiconductor switching element of the igniter circuit are synchronized when the lighting of the high-voltage discharge lamp is started, such that the semiconductor switching element of the igniter circuit is turned on after a predetermined period of time after the semiconductor switching element of the DC-DC converter circuit is turned on, and such that the semiconductor switching element of the DC-DC converter circuit is controlled not to output ON pulses when the voltage detected by the output-voltage detecting circuit changes and drops by a predetermined value or more within a predetermined period of time even when ON/OFF timings for the semiconductor switching element of the DC-DC converter circuit arrive at the semiconductor switching element of the DC-DC converter circuit; and the control circuit is arranged and programmed to control the DC-DC converter circuit using a pulse width modulation control scheme by setting a switching frequency of the semiconductor switching element included in the DC-DC converter circuit so as to be an integer multiple of a switching frequency of the semiconductor switching element included in the igniter circuit.

2. The lighting apparatus for the high-voltage discharge lamp according to claim 1, wherein the DC-DC converter circuit is a step-down chopper DC-DC converter circuit.

3. The lighting apparatus for the high-voltage discharge lamp according to claim 1, wherein the DC-AC inverter circuit is a full-bridge inverter circuit.

4. The lighting apparatus for the high-voltage discharge lamp according to claim 1, wherein the control circuit includes a digital signal processor.

5. The lighting apparatus for the high-voltage discharge lamp according to claim 1, wherein the control circuit includes a digital signal processor that is arranged to switch the DC-DC converter circuit to a fixed-current control mode after the high-voltage discharge lamp is lit, and to control gain of negative feedback control performed by the control circuit to prevent the output current of the DC-DC converter circuit from fluctuating and to stabilize the output current of the DC-DC converter circuit when the semiconductor switching element of the DC-DC converter circuit is controlled using the pulse width modulation control scheme.

* * * * *